Aug. 4, 1964 J. V. MARTENS ETAL 3,143,715

IMPEDANCE MATCHED HYBRID NETWORK

Filed May 11, 1962

Inventors:
J. MARTENS
A. FETTWEIS
C. DAEMS
By [signature] A. Weiss
Attorney

United States Patent Office 3,143,715
Patented Aug. 4, 1964

3,143,715
IMPEDANCE MATCHED HYBRID NETWORK
Jean Victor Martens, Alfred Leo Maria Fettweis, and Karolus Ludovicus Daems, Antwerp, Belgium, assignors to International Standard Electric Corporation, New York, N.Y., a corporation of Delaware
Filed May 11, 1962, Ser. No. 193,973
Claims priority, application Netherlands May 18, 1961
7 Claims. (Cl. 333—8)

Figure 1:
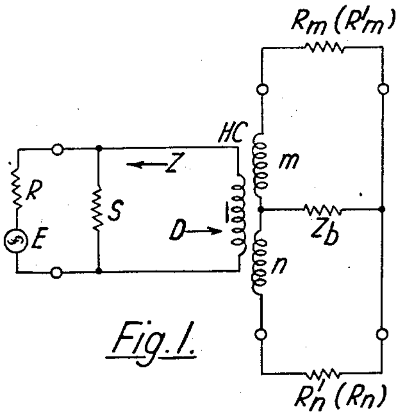

The invention relates to an impedance network exhibiting substantially infinite loss between a first and a second terminating impedance respectively connected to a first and to a second pair of terminals of said network, a third terminating impedance being connected to a third pair of terminals of said network.

Such impedance networks are well-known and in order to achieve minimum transmission losses between the third pair of terminals and one or the other of said first and second pairs of terminals, the network is usually realized with the help of a hybrid coil associated with a balancing network, the impedance of which is arranged to match the impedance at the third pair of terminals. Usually, such a network is matched at all three pairs of terminals and in fact at the fourth pair of terminals if one counts on the balancing network and the interconnecting network thus obtained is biconjugate, there being no transmission between the first and the second pairs of terminals and also no transmission between the third pair of terminals and the fourth to which the balancing network is connected.

The decoupling between the first and the second pairs of terminals may be used to advantage when a series of filter networks for instance have to be connected in parallel or in series. If these filters cover adjacent frequency bandwidths, the odd ranked filters may be connected in parallel to the first pair of terminals while the group of paralleled even ranked filters is connected to the second pair of terminals. In this way, any filter is associated with the third pair of terminals and if the impedance network is symmetrical, this association entails the usual loss of 3 decibels. But, the advantage of such an arrangement is that any filter is decoupled to a very large extent from the two filters covering the adjacent bandwidths on each side of the filter concerned. This means that the attenuation requirements can be substantially relaxed and an overall economy in the design can be achieved in this manner. Unfortunately, while each filter will present a substantially purely resistive impedance in the passband, outside the passband the impedance offered by the filter is very much different. If the bandpass filters considered are of the type corresponding to a series tuned circuit, outside the passband they will offer a very high impedance which can be considered as substantially infinite. This means that considering a signal at any particular frequency, the usual hybrid coil interconnecting network will no longer be matched at all terminations. If each group of filters is constituted by a parallel arrangement there will still be matching either at the first or the second pair of terminals which corresponds to the bandpass filter admitting the signal at the frequency considered. But at the second or at the first pair of terminals where the group of parallel filters does not include the filter concerned, matching cannot be secured. This is not particularly objectionable, but the absence of matching at the third pair of terminals is.

In such a situation the usual practice would be to insert an attenuation pad, e.g. at the third pair of terminals, so that the incorrect impedance offered thereat by the hybrid coil network will be absorbed by the pad which will offer a substantially correct impedance to the outside circuitry. This is at the expense of an increase in the attenuation which is proportional to the extent of matching desired since the greater the attenuation of the pad, the lesser will be the reflections due to incorrect matching.

The general object of the invention is to avoid such an attenuation pad and to secure perfect matching in a particularly simple way necessitating a minimum of additional components and entailing a minimum extra loss.

In accordance with a characteristic of the invention, one or more compensating impedances are associated with one or more of said three pairs of terminals, the values of said compensating impedances being so chosen that when said first pair of terminals is terminated by an impedance ($R_m$) matching that offered by said network while said second pair of terminals is terminated by an impedance ($R'_n$) which is not matched to that offered by said network and vice versa with an unmatched impedance ($R'_m$) at said first pair of terminals together with a matched impedance ($R_n$) at said second pair of terminals, the impedance offered by said network at the third pair of terminals matches the third terminating impedance thereat while the transmission losses between said first and said third pairs of terminals and between said second and said third pairs of terminals are minimized.

In accordance with another characteristic of the invention, the pairs of terminating impedances ($R_m/R'_n$ and $R'_m/R_n$) which may be connected at said first and second pairs of terminals have their values so inter-related that the ratio between the matched impedances at said first and second pairs of terminals $$\left(\frac{R_m}{R_n}\right)$$

is equal to the ratio of the inverse reflection coefficients ($M/N$) when the unmatched impedance is present at said first or second pair of terminals, i.e.

$$\frac{R_m}{R_n}=\frac{(R_m+R'_m)(R_n-R'_n)}{(R_m-R'_m)(R_n+R'_n)}=\frac{M}{N}$$

In accordance with a further characteristic of the invention, a single compensating impedance is associated either in parallel or in series with the terminating impedance at said third pair of terminals and this single compensating impedance having such a value that the impedance Z formed by the combination of this single compensating impedance with the terminating impedance at said third pair of terminals is related to the impedance D seen into the network at said third pair of terminals by the formula $$\frac{D}{Z}=\frac{M+N-1}{M+N+1}$$

where M and N are the inverse reflection coefficients at said first and third pairs of terminals respectively, i.e.

$$M=\frac{R_m+R'_m}{R_m-R'_m}\text{ and }N=\frac{R_n+R'_n}{R_n-R'_n}$$

In this manner, it can be shown that the transmission loss between the first and the third pairs of terminals as well as the transmission loss between the second and the third pairs of terminals can in the case of an impedance network constituted by a symmetrical hybrid coil associated with a balancing impedance, be minimized to 4.77 decibels in the practical case where the unmatched filter impedances $R'_m$ and $R'_n$ outside the passbands are either substantially infinite when the filters are paralleled, or substantially zero when the filters are in series. Thus this is but a moderate increase of the loss above the conventional 3 decibels loss but with the advantage that the single compensating impedance affords matching at the two pairs of terminals which are effectively used for any transmission.

Figure 2:
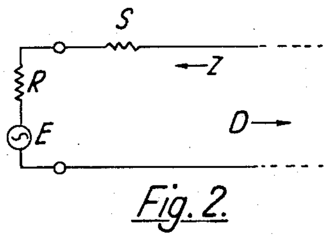
Figures 3, 4, 5:
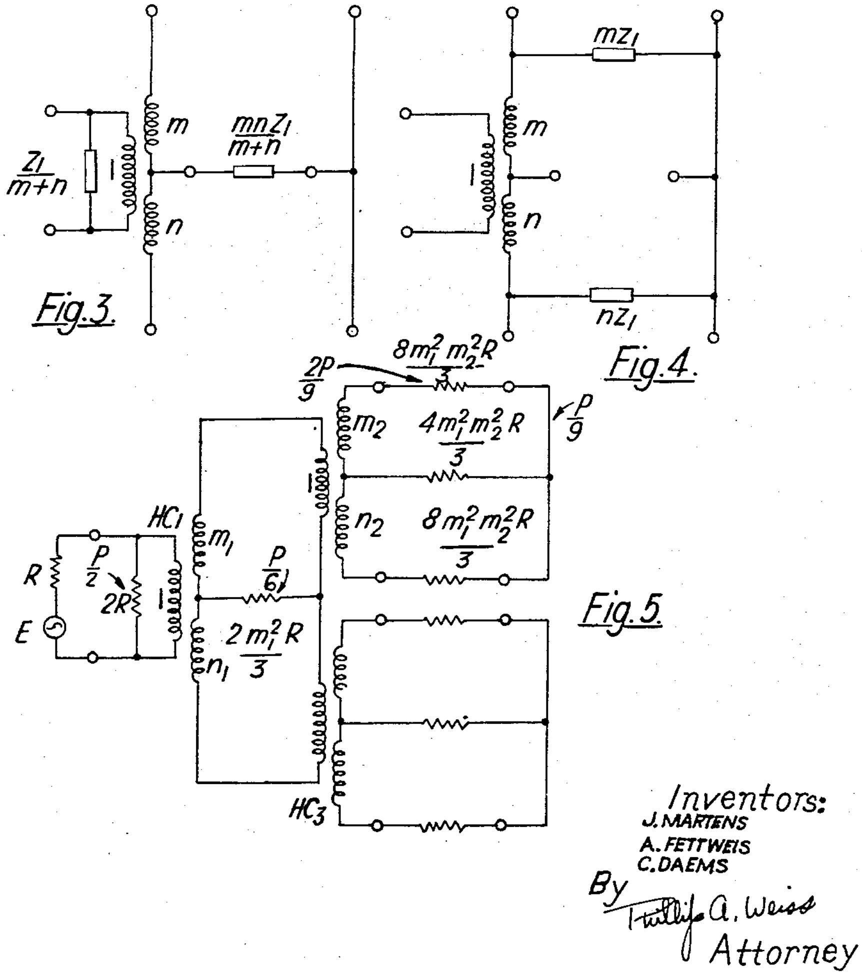

The above and other objects and features of the invention as well as the invention itself will be better understood from the following detailed description of embodiments of the invention to be read in conjunction with the accompanying drawings which represent:

FIG. 1 a general embodiment of the invention using a hybrid coil associated with a balancing resistance;

FIG. 2, a modification of the circuit of FIG. 1 in which the single parallel compensating resistance of FIG. 1 is replaced by a series compensating resistance;

FIG. 3, a hybrid coil arrangement incorporating a balancing impedance as well as another impedance branch for the purpose of determining a complete equivalence with the circuit of FIG. 4, showing a circuit identical to that of FIG. 3 but with two other impedances connected across the two other branches of the hybrid coil; and FIG. 5, a repeated use of the circuit of FIG. 1, permitting to associate more thant wo groups of circuits.

Referring to FIG. 1, the latter represents a hybrid coil network comprising a hybrid coil HC with a first winding labelled 1 inductively coupled to two serially associated windings labelled $m$ and $n$ respectively, this representing the number of turns of these last two windings taken with respect to the number of turns of the first winding mentioned. One end of the $m$ winding, the common end of the $m$ and $n$ windings, and the other end of the $n$ winding are connected to a common terminal through the impedances $R_m$, $Z_b$ and $R'_n$ respectively. Across the primary winding of the hybrid coil, i.e. with unitary turns ratio, is connected a source of E.M.F. E and internal resistance R. This is also shunted by the compensating resistance S. Thus, the three external terminating resistances of the hybrid coil network are $R_m$, $R'_n$ and R, the impedance $Z_b$ constituting the balancing network. Provided $Z_b$ is suitably related to the combined impedance shunting the winding with unitary turns ratio, the terminating resistances $R_m$ and $R'_n$ will be decoupled from one another. This particular value for $Z_b$ is a function, of $m$ and $n$, i.e.

$$Z_b = mnZ \tag{1}$$

wherein Z represents the combined impedance of R and S.

It will be noted that next to $R_m$ and $R'_n$ in FIG. 1 the references $(R'_m)$ and $(R_n)$ have been inscribed. These are used to denote that the hybrid coil network may alternatively be terminated by the pair of resistances $R_m$ and $R'_n$ or by the pair of resistances $R'_m$ and $R_n$. This will be the case for instance, if these terminating resistances represent the combined input resistance of a set of bandpass filters all connected in parallel, there being two sets of such parallel filters, one connected on the $m$ side and one connected on the $n$ side. For any signal of a particular frequency, only one of these filters, assuming that they cover adjacent distinct bandwidths, will offer a resistive impedance such as $R_m$ or alternatively $R_n$ on the other side, while the other input impedances of the remaining filters will be substantially infinite.

Since the $m$ side is perfectly decoupled from the $n$ side when relation (1) is satisfied, the impedance seen into the network on the side of the $R_m$ terminating impedance, is independent of the terminating resistance on the $n$ side, i.e. $R'_n$, and to match the terminating resistance $R_m$ to this impedance offered by the network, the relation $$R_m = m(m+n)Z \tag{2}$$

must be satisfied. Likewise, when the pair of terminating resistances $R_m$ and $R'_n$ is replaced by the resistances $R'_m$ and $R_n$, the latter resistance can be matched to the impedance offered by the network on the $n$ side provided the relation $$R_n = n(m+n)Z \tag{3}$$

if fulfilled. From these last two relations, and also from (1) one may derive $$\frac{m}{n} = \frac{R_m}{R_n} \tag{4}$$

$$Z_b = mnZ = \frac{R_m R_n}{R_m + R_n} \tag{5}$$

which permit to define the ratio between $m$ and $n$ as equal to the ratio between the matched resistance $R_m$ and $R_n$ alternatively terminating the network on the $m$ and on the $n$ sides respectively, whereas the balancing impedance $Z_b$ is defined as equal to the parallel combination of these matched resistances.

If the impedance seen by the combined impedance Z into the network on the side of the unitary turns coefficients is called D, the following double relation may be written down to express D in function of the pair of terminating resistances $R_m$ and $R'_n$ or the pair of terminating resistances $R'_m$ and $R_n$, i.e.

$$D = \frac{(R_m + R'_n)Z_b + R_m R'_n}{(m+n)^2 Z_b + m^2 R'_n + n^2 R_m} = \frac{(R'_m + R_n)Z_b + R'_m R_n}{(m+n)^2 Z_b + m^2 R_n + n^2 R'_m} \tag{6}$$

The relations (5) and (6) as well as (4) may be shown to lead to $$\frac{m}{n} = \frac{R_m}{R_n} = \frac{M}{N} \tag{7}$$

$$\frac{D}{Z} = \frac{M+N-1}{M+N+1} \tag{8}$$

wherein M and N are inverse reflection coefficients when the network is terminated, on the $m$ side, by $R'_m$ instead of the matched resistance $R_m$ and on the $n$ side, by $R'_n$ instead of the matched resistance $R_n$ respectively, i.e.

$$M = \frac{R_m + R'_m}{R_m - R'_m} \tag{9}$$

$$N = \frac{R_n + R'_n}{R_n - R'_n} \tag{10}$$

Under these conditions, one may also calculate the power transmission through the network of FIG. 1. Calling $P_1$ the power fed into the winding with unitary turns ratio and $P_m$ the power reaching the matched terminating resistance $R_m$, the power ratio may be expressed as $$\frac{P_m}{P1} = \frac{M(M+N)}{(M+N+1)(M+N-1)} \tag{11}$$

Considering the results obtained so far, it is seen that relation (7) implies that the two pairs of terminating resistances on the $m$ and $n$ sides must satisfy a particular relation. In the case where an unmatched resistance $R'_m$ can be considered as substantially larger than the matched resistance $R_m$, M will be substantially equal to $-1$ and this will also be the case for N provided $R'_n$ is also sufficiently large with regard to $R_n$. In such a case, (7) indicates that $R_m$ should be equal to $R_n$ while the turns ratios $m$ and $n$ should also be equal. For such a symmetrical network, with both M and N equal to $-1$, (8) indicates that the ratio between D and Z is equal to 3 while (11) indicates that two thirds of the power reaching the unitary turns ratio winding is dissipated in the matched terminating resistance $R_m$. Since at that time the $n$ side is terminated by a substantially infinite resistance $R'_n$, it is clear that the remaining third of the power reaching the unitary turns ratio winding will be wasted in the balancing impedance $Z_b$.

When the network is terminated by the unmatched resistance $R'_m$ and by the matched terminating resistance $R_n$, the power ratio reaching $R_n$ will be given by an expression corresponding to (11) with N being exchanged for M and vice versa and in a symmetrical network, two thirds of the input power to the hybrid coil HC will also reach $R_n$.

Knowing the ratio between D and Z, and since as clearly shown by FIG. 1 both Z and D may be expressed in terms of R, the source resistance, and S, the compensating resistance, i.e.

$$\frac{1}{Z}=\frac{1}{R}+\frac{1}{S} \qquad (12)$$

$$\frac{1}{D}=\frac{1}{R}-\frac{1}{S} \qquad (13)$$

the ratio of the power $P_1$ to P the maximum power available from the voltage source E with internal resistance R, may be expressed as $$\frac{P_1}{P}=\frac{4RP_1}{E^2}=\frac{R}{D}=\frac{M+N+1}{M+N} \qquad (14)$$

When both M and N are practically equal to $-1$, this power ratio is thus equal to one half which means that half the maximum available power from the source E is dissipated in the compensating resistance S. Indeed, the ratio between S and R is readily found to be $$\frac{S}{R}=-(M+N) \qquad (15)$$

showing that when both M and N are equal to $-1$, the value of S should be twice that of the source resistance R. Multiplying (11) by (14), gives $$\frac{P_m}{P}=\frac{M}{M+N-1} \qquad (16)$$

expressing the ratio between the power reaching $R_m$ and the maximum power available from the source. The corresponding ratio for the power reaching $R_n$ will obviously be obtained by replacing M by N. In the particular case where both M and N are equal to $-1$, (16) indicates that one third of the available power reaches the terminating resistance $R_m$ or alternatively the terminating resistance $R_n$.

All the relations up to and including (11) are independent of the particular way in which the compensating resistance S is connected. FIG. 1 shows that it is in parallel with the source R but in some circumstances, this compensating resistance S might instead be connected in series with R.

FIG. 2 shows this modification of FIG. 1 and five relations analogous to (12), (13), (14), (15), (16), may be secured for the arrangement of FIG. 2, i.e.

$$Z=R+S \qquad (12')$$

$$D=R-S \qquad (13')$$

$$\frac{P_1}{P}=\frac{4RP_1}{E^2}=\frac{D}{R}=\frac{M+N-1}{M+N} \qquad (14')$$

$$\frac{S}{R}=\frac{1}{M+N} \qquad (15')$$

$$\frac{P_m}{P}=\frac{M}{M+N+1} \qquad (16')$$

While in (14) R and D are related by (13) it should not be forgotten that in (14') D and R are related by (13').

Whereas (15) indicates that for a positive valve of the compensating resistance S, $M+N$ must be negative, for the arrangement of FIG. 2, (15') indicates that for the same reason $M+N$ must now be positive. Since (7) indicates that M and N must have the same sign, the arrangement of FIG. 1 is particularly adapted to the case where both the unmatched resistances $R'_m$ and $R'_n$ are larger than the corresponding matched terminating resistance $R_m$ or $R_n$. The opposite is true in the case of the arrangement of FIG. 2. Thus the shunt compensating resistance is to be used when the unmatched terminations are high impedances as in the case of parallel filters which must necessarily offer input impedances of the series tuned type in order not to short-circuit one another.. The arrangement of FIG. 2 on the other hand, will be suitable in the dual case when the unmatched terminations are very low resistances such as would be the case for sets of series connected filters offering impedances of the shunt tuned type.

In the case of FIG. 2, when the unmatched resistances $R'_m$ and $R'_n$ may be assimilated to a short-circuit, both M and N will then be equal to $+1$ and the remarks made above when both M and N were equal to $-1$ are also valid, since the power distribution is independent of whether both M and N are equal to $+1$ or $-1$. But in the case of FIG. 2, the resistance S will naturally be half the source resistance R in order to dissipate half the available power.

While the arrangements of FIGS. 1 and 2 are believed to be the simplest, there are alternatives giving similar results, i.e. a transmission loss minimized to 4.77 decibels in the case of a symmetrical network with $m=n$ may be obtained with more than one compensating resistance. For instance, instead of the arrangement of FIG. 1, one may use two compensating resistances, one in shunt with the $m$ termination and one in shunt with the $n$ termination. The possibility of having such an arrangement can most simply be demonstrated in function of the results so far achieved with the help of the following equivalence.

FIG. 3 shows the hybrid coil similar to that of FIG. 1 but wherein the balancing impedance is labelled $$\frac{mnZ_1}{m+n}$$

whereas the compensating impedance in shunt across the unitary turns ratio winding is labelled $$\frac{Z_1}{m+n}$$

Thus, these two impedances are in a ratio $mn$ as before, whereby the $m$ and $n$ sides of the hybrid coil are decoupled from one another.

FIG. 4 shows a similar hybrid coil network but where these last two impedances have been replaced by the impedances $mZ_1$ and $nZ_1$ shunting respectively the $m$ and $n$ terminations. It can readily be shown that the two networks of FIGS. 3 and 4 are absolutely equivalent, i.e. the four driving point impedances at the four pairs of terminals as well as the six possible transfer impedances for any pair out of the four pairs of terminals can be shown to be rigorously equivalent with one another.

This means that considering FIG. 1 the shunt compensating resistance S can be made larger by withdrawing from it a shunt resistance which may be identified with $$\frac{Z_1}{m+n}$$

shown in FIG. 3. Provided that while this amount of shunt resistance is withdrawn from S a shunt resistance $mn$ times as high, is withdrawn from the balancing impedance $Z_b$, and that instead the shunt resistances having the values shown in FIG. 4 are introduced across the $m$ and $n$ pairs of terminals respectively, the hybrid coil network will still operate in exactly the same manner. Obviously, the shunt compensating resistance S can be made infinite, i.e. can be totally removed provided that $Z_b$ is correspondingly increased to the value $$mnR=\frac{M+N-1}{M+N}\,\frac{RmRn}{Rm+Rn} \qquad (17)$$

and that the following shunt resistances are respectively introduced across $R_m(R'_m)$ and across $R'_n(R_n)$:

$$-(M+N-1)R_m \qquad (18)$$

$$-(M+N-1)R_n \qquad (19)$$

Thus in a symmetrical network, whereas FIG. 1 requires a compensating resistance S equal to 2R, with the equivalent circuit just described, the compensating resistances given by (18) and (19) will be respectively equal to $3R_m$ and to $3R_n$. Likewise, whereas in FIG. 1 the balancing resistance $Z_b$ is equal to the parallel combination of $R_m$ and $R_n$ by virtue of (5), in view of (17), the balancing resistance for the network equivalent just described will be equal to $$\frac{3}{2}$$

times that value.

It will be appreciated that whereas bandpass filters are a natural application for the circuit described, the latter may also be useful in other circumstances, whenever it is desired to decouple at least two sources or two loads from one another and which sources or loads may have two distinct impedance values whereas it is also desired that one of these two values for each source or load should be matched to the impedance offered by the network, while at the same time matching is always secured at a third pair of terminals of the network to which energy must be transmitted from said sources or received for said loads. Also, these two sources or loads might be connected to the hybrid coil network terminals which are shown by FIG. 1 to be used for the source impedance R and the balancing impedance $Z_b$, these two impedances then taking the place of $R_m$ and $R'_n$. But with the arrangement shown, the two circuits or the two sets of circuits to be decoupled, e.g. filter or oscillators, may readily keep a common terminal.

In the case of bandpass filters such as used in carrier telephony, e.g. channel filters spaced at 4 kc./s. from one another, the circuit of FIG. 1 will be particularly useful in reducing the atenuation requirements of these channel filters to a substantial extent since in each 4 kc./s. band, the corresponding filter should normally pass the frequencies from 300 to 3400 c./s. If all the filters are grouped in parallel, there is normally a minimum of 600 c./s. between the passband of one filter corresponding to a lower sideband and the passband of the next filter, corresponding to the upper sideband. By paralleling the odd ranked filters on the *m* side of FIG. 1 and by paralleling the even ranked filters on the *n* side, the spacing will now exceed 4 ks./s. In this manner, the attenuation required in the stopband of each filter is considerably less and this advantage is of much more importance than the additional loss of 4.77 decibels which is incurred by the matched splitting arrangement. In the above example, the splitting technique described affords a multiplication of the separation between adjacent channels by an appreciable factor. If it should be desirable to further increase this factor, for instance in the case of very narrow tuned filters, the splitting operation in two groups can be repeated in pyramid-like fashion, e.g. four groups, eight groups, etc. and by omitting a termination or hybrid coils a division into any number of groups say 3, can be obtained. In each case the filters forming a group will be suitably interleaved with those from the other groups in order to secure maximum frequency separation between the adjacent bandwidths of two filters included in the same group.

FIG. 5 shows the principle of such an extension by using four groups. In this figure it is assumed that the hybrid coils are symmetrical and the compensating resistance S of FIG. 1 connected in shunt across the source voltage E of internal resistance R is therefore equal to 2R. By virtue of the previous results the balancing impedance for this first hybrid coil network $HC_1$, with turns ratios $m_1=n_1$, coupled to the source E, is therefore equal to $$\frac{2m^2{}_1R}{3}$$

As shown by FIG. 5, the $m_1$ side is connected to the unitary turns ratio side of a second hybrid coil $HC_2$ whose other windings have turns ratios $m_2$ and $n_2$ also equal to one another in order to secure a symmetrical arrangement. The value of the balancing impedance for the $HC_2$ network is again indicated in the figure, together with the value of the matched terminating resistances. The $n_1$ side of the hybrid coil $HC_1$ is connected to a hybrid coil $HC_3$ with associated resistances and which are not further specified as this network is identical to the hybrid coil network $HC_2$. Thus there are altogether four terminating impedances which may be coupled to R and E while being perfectly decoupled from one another. This leads to a division into four groups, but obviously three groups may be used by replacing one of the terminations by an open circuit.

In general, for a division into at most $2^k$ and at least $2^{k-1}+1$ groups, and using symmetrical hybrid coils throughout, the transmission loss in decibels is given by $$k \log_{10}\left(\frac{3}{2}\right)+\log_{10}{}^2 \qquad (20)$$

each additional splitting stage thus introducing an extra loss of 1.77 decibels over the basic loss of 3 decibels, only the single compensating shunt resistance 2R being required in shunt across the common branch. Arrows in FIG. 5 indicate the amounts of power which reach the various parts of the circuit in function of the maximum available power P, assuming that the top one out of the four terminating resistances is the matched resistance, the other three being of sufficiently high value as compared to the first.

While the principles of the invention have been described above in connection with specific apparatus, it is to be clearly understood that this description is made only by way of example and not as a limitation on the scope of the invention.

We claim:

1. In an impedance matching network including hybrid circuit means comprising first, second, and third terminal pairs with substantially infinite loss between said first and said second terminal pairs, a first terminating impedance connected across said first terminal pair, a second terminating impedance connected across said second terminal pair, a third terminating impedance connected across said third terminal pair, and at least one compensating resistor associated with at least one of said terminal pairs for causing the impedance of said network at said third pair to match said third terminating impedance when said first terminating impedance has a certain value that matches the impedance of said network at said first terminal pair while said second terminating impedance has a predetermined value that does not match the impedance of said network at said second terminal pair and when said first terminating impedance has a predetermined value that does not match the impedance of said network at said first terminal pair while said second terminating impedance has a certain value that does match the impedance of said network at said second terminal pair whereby transmission losses between said first and said third terminal pairs and between said second and said third terminal pairs are minimized.

2. In the impedance matching network of claim 1 wherein the terminating impedances connected at said first and second terminal pairs are so related that the ratio between the predetermined impedances when they respectively match the network impedances at said first and second terminal pairs is equal to the inverse reflection co-efficient at said first terminal pair (M) divided by the inverse reflection co-efficient at said second terminal pair (N) when the unmatched impedance is present at either said first or second terminal pair, where the said inverse reflection co-efficients are equal to the sum of the certain impedance that matches the network impedance plus the predetermined impedance that does not match the network impedance at the terminal pair to which their impedances are connected divided by the difference between the said certain impedance and the said predetermined impedance at the terminal pair to which the impedances are connected.

3. In the impedance matching network of claim 2 wherein there is only a single one of said compensating resistors and said compensating resistor is associated with the said third terminal pair, and wherein said resistor has a value such that the impedance (Z) formed by the combination of said resistor with the terminating impedance at said third terminal pair is related to the network impedance (D) at said third terminal pair by the relationship $$D/Z=\frac{M+N-1}{M+N+1}$$

4. In the impedance matching network of claim 3 wherein the absolute value of both of the reflection coefficients at said first and second terminal pairs are substantially equal to unity, a power source connected to said third terminal pair, and wherein substantially one-half the power derived from said source is dissipated in the said terminating impedance of said certain value that matches said network impedance at said first or second terminal pair.

5. The impedance matching network of claim 3 wherein a second hybrid circuit means is connected to said first terminal pair and a third hybrid circuit means is connected to said second terminal pair, said second and third hybrid circuit means being similar to said first hybrid circuit means.

6. The impedance matching network of claim 3 wherein said first and said second terminating impedances comprise combinations of frequency selective networks.

7. In an impedance matching network, hybrid coil means comprising a first winding, a second winding serially connected to said first winding, a third winding inductively coupled to said serially connected windings, a first terminal pair, one end of said first winding connected to one terminal of said first terminal pair, a second terminal pair, one end of said second winding connected to one terminal of said second terminal pair, the other terminal of said first terminal pair connected to the other terminal of said second terminal pair, a first terminating impedance $R_m$, connected across said first terminal pair, a second terminating impedance $R'_n$ connected across said second terminal pair, balancing impedance means $Z_b$ connected from the common end of said first and said second winding and said common connection of said other terminals of said first and second terminal pairs, signal source means E having series internal impedance R connected across said third winding, said balancing impedance means being of a value to decouple said first terminating impedance from said second terminating impedance and a compensating resistance S chosen so that when said first terminating impedance matches the characteristic network impedance at said first terminal pair and said second terminating impedance does not match the characteristic network impedance at said second terminal pair the network impedance at said third terminal pair is matched by the combined impedance of said third terminating impedance and said compensating resistance S.

References Cited in the file of this patent

UNITED STATES PATENTS

| | | |
|---|---|---|
| 2,614,170 | Marie | Oct. 14, 1952 |
| 2,784,381 | Budenbom | Mar. 5, 1957 |
| 2,909,733 | Walter | Oct. 20, 1959 |